(12) United States Patent
Chou et al.

(10) Patent No.: US 8,171,565 B2
(45) Date of Patent: May 1, 2012

(54) SYSTEMS AND METHODS FOR LOCALLY GENERATING LICENSE AND ACTIVATING DRM AGENT

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 399 days.

(21) Appl. No.: 12/542,947

(22) Filed: Aug. 18, 2009

(65) Prior Publication Data
US 2011/0047615 A1 Feb. 24, 2011

(51) Int. Cl.
*G06F 21/00* (2006.01)
(52) U.S. Cl. ............... 726/29; 726/26; 726/27; 713/189
(58) Field of Classification Search .................. None
See application file for complete search history.

(56) References Cited

U.S. PATENT DOCUMENTS

| | | | | |
|---|---|---|---|---|
| 5,715,403 A * | 2/1998 | Stefik | | 705/44 |
| 6,189,146 B1 * | 2/2001 | Misra et al. | | 717/177 |
| 6,385,596 B1 * | 5/2002 | Wiser et al. | | 705/51 |
| 7,010,808 B1 * | 3/2006 | Leung et al. | | 726/26 |
| 7,194,092 B1 * | 3/2007 | England et al. | | 380/262 |
| 7,278,165 B2 * | 10/2007 | Molaro | | 726/27 |
| 2002/0013772 A1 * | 1/2002 | Peinado | | 705/51 |
| 2002/0026424 A1 * | 2/2002 | Akashi | | 705/57 |
| 2004/0187014 A1 * | 9/2004 | Molaro | | 713/200 |
| 2005/0278258 A1 * | 12/2005 | O'Donnell et al. | | 705/59 |
| 2006/0021068 A1 * | 1/2006 | Xu et al. | | 726/30 |
| 2006/0085355 A1 * | 4/2006 | Coley et al. | | 705/59 |
| 2006/0150257 A1 * | 7/2006 | Leung et al. | | 726/27 |
| 2007/0150963 A1 * | 6/2007 | Lee et al. | | 726/27 |
| 2008/0034421 A1 * | 2/2008 | Ahn et al. | | 726/17 |
| 2008/0244751 A1 * | 10/2008 | Peinado | | 726/26 |
| 2010/0293622 A1 * | 11/2010 | Nikitin et al. | | 726/31 |

* cited by examiner

*Primary Examiner* — Ponnoreay Pich
(74) *Attorney, Agent, or Firm* — Thomas|Kayden

(57) ABSTRACT

Systems and methods for locally generating a license and activating a Digital Rights Management (DRM) agent are provided. The system includes a storage device and an electronic device. The storage device includes a DRM treated file, operation information, and a management application. The electronic device activates the management application from the storage device to retrieve information, such as a Unique Identification (UID) or a DRM machine certificate from the electronic device, and generate a license for the electronic device according to the operation information, and the retrieved information of the electronic device. The electronic device activates a DRM agent by providing the DRM treated file and the license to the DRM agent for playing back the DRM treated file based on the license. The management application may set the license expired after the DRM treated file is played back on the electronic device.

13 Claims, 3 Drawing Sheets

SYSTEMS AND METHODS FOR LOCALLY GENERATING LICENSE AND ACTIVATING DRM AGENT

BACKGROUND OF THE INVENTION

1. Field of the Invention

The disclosure relates generally to digital Rights Management (DRM), and, more particularly to systems and methods for locally generating a license and activating a DRM agent on an electronic device.

2. Description of the Related Art

With electronic devices, such as computers or portable devices, being popular, digital content has become a major data type for the devices due to increased convenience of digital content. Thus, content providers have been devoted to developing more related applications for digital content.

Currently, two conventional delivery manners can be used for digital content. In an off-line manner, digital content is stored in a disc, such as a CD/VCD/DVD. Users can obtain the digital content from marketing systems, such as music/movie stores, and play back the digital content at any time, and in any playback device. Since content has been recorded in the discs, it is efficient for users to obtain and play back the digital content. However, since management of marketing systems is difficult and related operating costs high, the digital content business model for the off-line manner has reached a bottleneck.

In an on-line manner, DRM content and/or a rights object/license can be downloaded via an internet or a mobile phone system to a memory of a playback device. Once the DRM content and the rights object/license are delivered to the playback device, a DRM agent such as an Open Mobile Alliance (OMA) DRM, a Windows Media DRM for Network Device (WMDRM-ND) process, or an Apple FairPlay™ process on the playback device combines the DRM content and the rights object/license to generate a content file, and bundles the content file with a device code of the playback device, such as such as an IMEI (International Mobile Electron Identification) code of a mobile phone. When an electronic appliance wants to access the content, it is determined whether or not the device code of the electronic appliance matches the device code bundled with the content file. If the device code of the electronic appliance matches the device code bundled with the content file, the electronic appliance accesses the content. In this manner, the content is forced to be bundled to a specific device, thus seriously limiting a user's fair use rights of owning the content, or so-called TRU (Traditional Rights and Usage), since a user will not be able to access the content with other devices.

BRIEF SUMMARY OF THE INVENTION

Systems and methods for locally generating a license and activating a DRM agent are provided.

An embodiment of a system for locally generating a license and activating a DRM agent includes a storage device and an electronic device. The storage device includes a DRM treated file, operation information, and a management application. The electronic device activates the management application from the storage device to retrieve information which is necessary to make a license of the content for the electronic device, such as a unique (identification (ID) or a DRM machine certificate of the electronic device, and then uses this information to generate a license for the electronic device according to the operation information and information retrieved from the electronic device. The electronic device activates a DRM agent by providing the DRM treated file and the license to the DRM agent for playing back the DRM treated file based on the license. The license may be becomes expired, by the setting of management application, after the DRM treated file is played back on the electronic device.

An embodiment of a storage device includes a DRM treated file, operation information, and a management application. When the storage device is connected to an electronic device, the management application is activated to retrieve information which is necessary to make a license of the content for the electronic device, such as a unique ID or a DRM machine certificate of the electronic device, and use the information retrieved from the electronic device to generate a license for the electronic device according to the operation information. The DRM treated file and the license are accordingly provided to a DRM agent on the electronic device for playback. The license may become expired after the DRM treated file is played back on the electronic device.

In an embodiment of a method for locally generating a license and activating a DRM agent, a storage device is provided. The storage device includes a DRM treated file, operation information, and a management application. The management application is activated from the storage device to retrieve information which is necessary to make a license of the content for the electronic device, such as a unique ID or a DRM machine certificate of an electronic device, and use it to generate a license for the electronic device according to the operation information, and the information retrieved from the electronic device. A DRM agent is activated by providing the DRM treated file and the license to the DRM agent for playing back the DRM treated file based on the license. After the DRM treated file is played back on the electronic device, the license may become expired by the setting of management application.

In some embodiments, the management application further retrieves a Unique Identification (UID) of the storage device and/or an authentication code, and authenticates the usage of management application according to the UID and/or the authentication code. When the authentication of the management application is passed, the management application is activated from the storage device.

Methods for locally generating a license and activating a DRM agent may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Systems and methods for locally generating a license and activating a DRM agent are provided.

Figure 1:
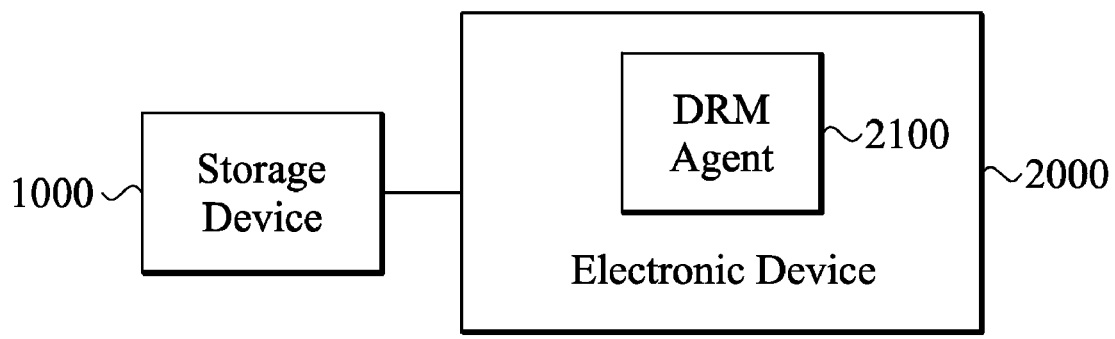
FIG. 1 is a schematic diagram illustrating an embodiment of a system for locally generating a license and activating a DRM agent according to the invention.

FIG. 1 is a schematic diagram illustrating an embodiment of a system for locally generating a license and activating a DRM agent according to the invention.

Figure 2:
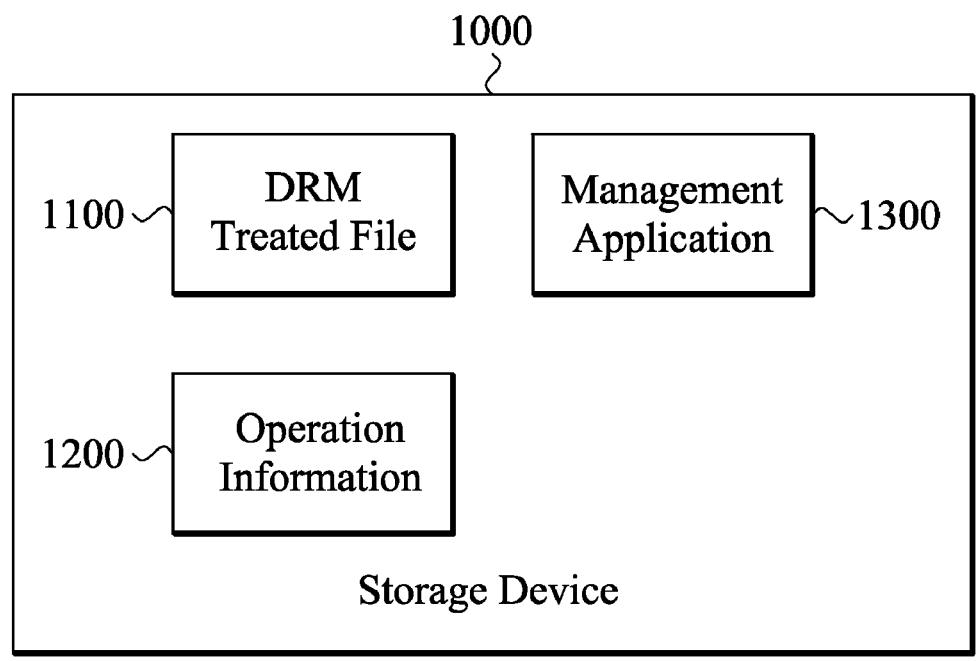
FIG. 2 is a schematic diagram illustrating an embodiment of a storage device according to the invention.

The system for locally generating a license and activating a DRM agent comprises a storage device 1000 and an electronic device 2000 coupled with the storage device 1000. FIG. 2 is a schematic diagram illustrating an embodiment of a storage device according to the invention. The storage device 1000 may be a memory device, such as an SD/micro SD card or a USB (Universal Serial Bus) disk. The storage device 1000 comprises at least one DRM treated file 1100, operation information 1200, and a management application 1300. The DRM treated file 1100 may be a content to be performed with DRM, and/or encrypted using a key. It is understood that, the generation of the DRM treated file 1100 can be performed by a content provider in advance. The operation information 1200 can be used to decrypt the DRM treated file 1100. In some embodiments, the operation information 1200 contains information which is necessary to authorize a license for the content and the electronic device, such as data and algorithm in order to derive a decryption key from the information contained in the DRM treated content and the information retrieved from the electronic device. In some embodiments, the operation information 1200 may contain a content ID and a key ID, and the DRM treated file is generated by performing DRM to a content corresponding to the content ID, and encrypting the content using a key corresponding to the key ID. The management application 1300 can locally generate a license. In some embodiments, the generated license may be a one-off (one-time) authorization. Further, in some embodiments, the management application 1300 can further perform a self-authentication. Related details are discussed later. It is understood that, in some embodiments, the DRM treated file 1100, the operation information 1200, and the management application 1300 can be downloaded from a server via a network to the storage device 1000. In some embodiments, the DRM treated file 1100, the operation information 1200, and the management application 1300 can be downloaded from a content vending machine. In other embodiments, the DRM treated file 1100, the operation information 1200, and the management application 1300 can be preloaded on the storage device. Further, in some embodiments, the DRM treated file 1100, the operation information 1200, and the management application 1300 can be preloaded to the storage device by the content provider. It is understood that, in some embodiments, the storage device may have a UID (not shown in FIG. 2). The storage device 1000 may comprise a semiconductor component, such as a memory, and the UID is a hardware serial number generated for the semiconductor component during manufacturing or a virtual serial number created for the semiconductor component by firmware/software. The use of the UID is discussed later. The electronic device 2000 may be a processor-based electronic device, such as a computer, or a portable device such as a mobile phone. The electronic device 2000 may have a DRM agent 2100 that performs DRM on the electronic device 2000. It is understood that, in some embodiments, the electronic device 2000 may have a UID (not shown in FIG. 1), such as an IMEI code, processor or memory ID of the electronic device 2000, and/or a DRM machine certificate (not shown in FIG. 1). The use of the UID and/or DRM machine certificate of the electronic device 2000 is discussed later. When the storage device 1000 is coupled to the electronic device 2000, the electronic device 2000 can activate the management application 1300 on the storage device 1000 to perform the method for locally generating a license and activating a DRM agent of the invention, which will be discussed further in the following paragraphs.

Figure 3:
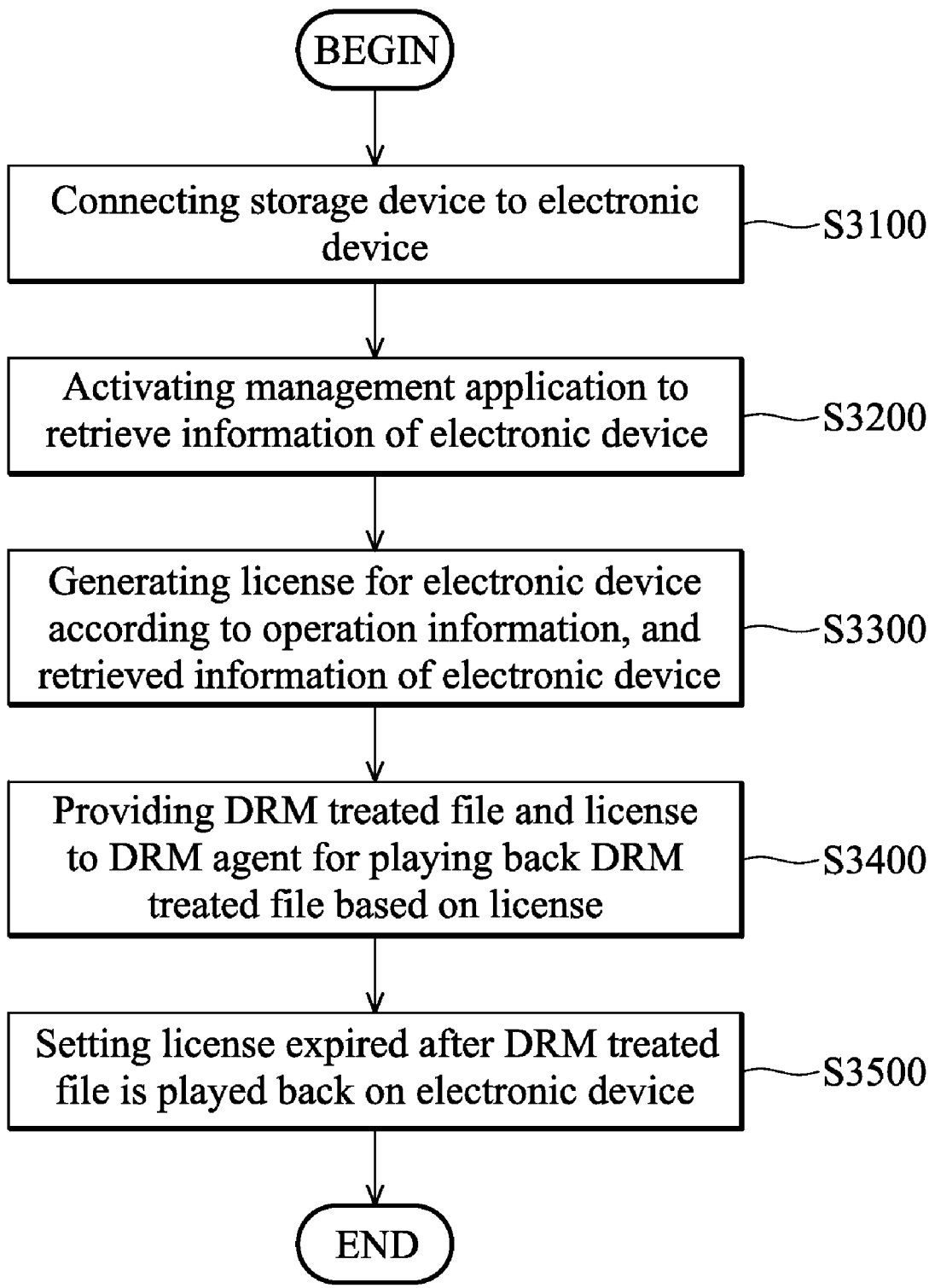
FIG. 3 is a flowchart of an embodiment of a method for locally generating a license and activating a DRM agent according to the invention.

FIG. 3 is a flowchart of an embodiment of a method for locally generating a license and activating a DRM agent according to the invention.

In step S3100, the storage device 1000 is connected to the electronic device 2000. Similarly, the storage device 1000 may comprise the DRM treated file 1100, the operation information 1200, and a management application 1300. In step S3200, the management application 1300 is activated from the storage device 1000 to retrieve information which is necessary to make a license of the content for the electronic device, such as the UID or the DRM machine certificate of the electronic device 2000; and in step S3300, the management application 1300 generates a license for the electronic device 2000 according to the operation information, and the retrieved information, such as the unique ID or the DRM machine certificate of the electronic device 2000. It is understood that, in some embodiments, once the storage device 1000 is connected to the electronic device 2000, the management application 1300 can be automatically activated. In some embodiments, the management application 1300 can be activated by user selection. It is understood that, in some embodiments, the generated license is a one-off authorization. That is, the DRM treated file 1100 on the storage device 1000 can be played back on the electronic device 2000 once. In step S3400, the DRM agent 2100 on the electronic device 2000 is activated by providing the DRM treated file 1100 and the generated license to the DRM agent 2100 for playing back the DRM treated file 1100 based on the generated license. As described, in some embodiments, the generated license may be a one-off authorization. After the DRM treated file 1100 is played back on the electronic device 2000, in step S3500, the generated license may become expired by the setting of management application 1300.

Figure 4:
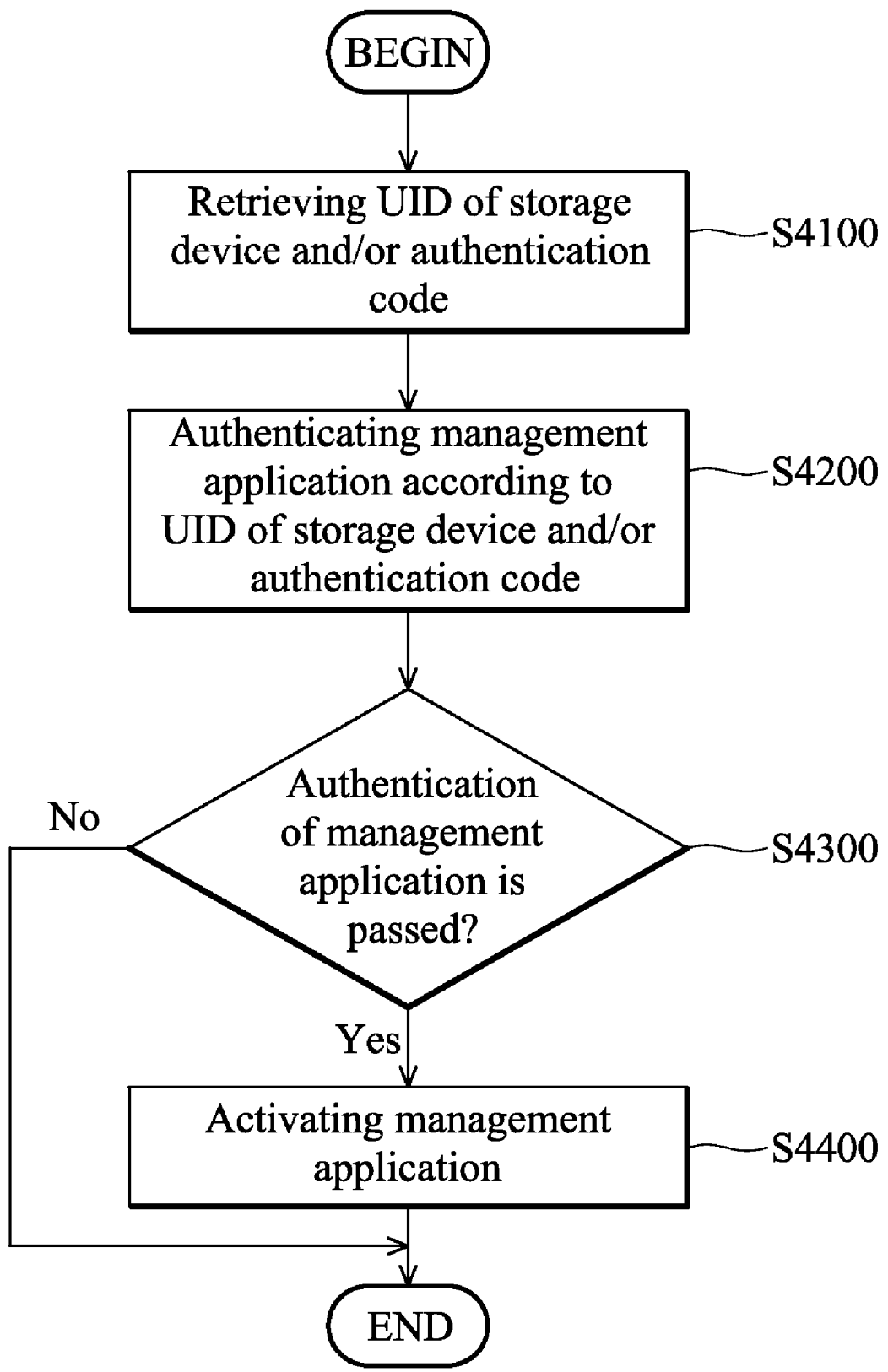
FIG. 4 is a flowchart of an embodiment of a method for authenticating a management application according to the invention.

It is understood that, in some embodiments, the management application 1300 on the storage device 1000 must be authenticated. FIG. 4 is a flowchart of an embodiment of a method for authenticating a management application according to the invention. In step S4100, the UID of the storage device 1000 is retrieved by the management application in order to perform authentication. Additionally, an authentication code may be also retrieved by the electronic device 2000 via an input interface (not shown in FIG. 1) of the electronic device 2000. It is noted that, the authentication code can be generated when the DRM treated file 1100 is download or purchased. In step S4200, the management application 1300 is authenticated according to the UID of the storage device 1000 and/or the authentication code. If the authentication of the management application 1300 is not passed (No in step S4300), the procedure is terminated. If the authentication of the management application 1300 is passed (Yes in step S4300), in step S4400, the management application 1300 is activated from the storage device 1000.

It is understood that, once the license becomes expired, the DRM treated file 1100 will not no longer be accessible (played back) to the electronic device 2000. In some situations, when a user wants to play back the DRM treated file on the same electronic device, the user can reactivate the management application, such that the procedure of FIG. 3 will be performed again.

Therefore, the systems and methods of the present invention can locally generate licenses and activate a DRM agent on the electronic device, thus maintaining the TRU of users.

Methods for locally generating a license and activating a DRM agent, or certain aspects or portions thereof, may take the form of a program code (i.e., executable instructions) embodied in tangible media, such as flash card or USB disk, wherein, when the program code is loaded into and executed by a machine, such as a computer, the machine thereby becomes an apparatus for practicing the methods.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for locally generating a license and activating a Digital Rights Management (DRM) agent, comprising:
    a storage device comprising a DRM treated file, operation information, and a management application; and
    an electronic device connected to the storage device, wherein the electronic device configured to activate the management application from the storage device to retrieve information of the electronic device, generate a license for the electronic device according to the operation information and the retrieved information of the electronic device, and activate a DRM agent by providing the DRM treated file and the license to the DRM agent for playing back the DRM treated file based on the license,
    wherein the management application sets the license to become expired after the DRM treated file is played back on the electronic device, and
    wherein the operation information comprises information which is necessary to authorize the license for the DRM treated file and the electronic device, and the information comprises data and algorithm in order to derive a decryption key from the information contained in the DRM treated file and the information retrieved from the electronic device.

2. The system of claim 1, wherein the management application further retrieves an authentication code or a Unique Identification (UID) of the storage device, authenticates the usage of management application according to the authentication code or the UID, and activates the management application from the storage device when the authentication of the management application is passed.

3. The system of claim 1, wherein the information retrieved from the electronic device comprises a unique identification (ID) or a DRM machine certificate.

4. The system of claim 1, wherein the operation information comprises a content ID and a key ID, and the DRM treated file is generated by performing DRM to a content corresponding to the content ID, and encrypting the content using a key corresponding to the key ID.

5. The system of claim 1, wherein the license is a one-off authorization.

6. The system of claim 1, wherein the DRM treated file, the operation information, and the management application on the storage device are downloaded from a server via a network, downloaded from a content vending machine, or preloaded on the storage device.

7. The system of claim 1, wherein the DRM treated file, the operation information, and the management application are preloaded to the storage device by a content provider.

8. A method for locally generating a license and activating a Digital Rights Management (DRM) agent, comprising:
    providing a storage device, wherein the storage device comprises a DRM treated file, operation information, and a management application;
    activating the management application from the storage device to retrieve information of an electronic device, and generating a license for the electronic device according to the operation information and the retrieved information of the electronic device;
    activating a DRM agent by providing the DRM treated file and the license to the DRM agent for playing back the DRM treated file based on the license; and
    setting the license expired after the DRM treated file is played back on the electronic device by the management application,
    wherein the operation information comprises information which is necessary to authorize a license for the content and the electronic device, and the information comprises data and algorithm in order to derive a decryption key from the information contained in the DRM treated file and the information retrieved from the electronic device.

9. The method of claim 8, further comprising:
    retrieving an authentication code or a Unique Identification (UID) of the storage device;
    authenticating the usage of management application according to the authentication code or the UID; and
    activating the management application from the storage device when the authentication of the management application is passed.

10. The method of claim 8, wherein the information retrieved from the electronic device comprises a unique identification (ID) or a DRM machine certificate.

11. The method of claim 8, wherein the operation information comprises a content ID and a key ID, and the DRM treated file is generated by performing DRM to a content corresponding to the content ID, and encrypting the content using a key corresponding to the key ID.

12. The method of claim 8, wherein the license is a one-off authorization.

13. The method of claim 8, wherein the DRM treated file, the operation information, and the management application on the storage device are downloaded from a server via a network, or downloaded from a content vending machine, or preloaded on the storage device.

* * * * *